United States Patent
Waheed

(10) Patent No.: US 9,634,845 B2
(45) Date of Patent: Apr. 25, 2017

(54) SESSION SWITCHING DURING ONGOING DATA DELIVERY IN A NETWORK

(75) Inventor: Iftikhar Waheed, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 989 days.

(21) Appl. No.: 13/382,038

(22) PCT Filed: Jul. 8, 2009

(86) PCT No.: PCT/EP2009/058704
§ 371 (c)(1),
(2), (4) Date: Jan. 3, 2012

(87) PCT Pub. No.: WO2011/003447
PCT Pub. Date: Jan. 13, 2011

(65) Prior Publication Data
US 2012/0117256 A1    May 10, 2012

(51) Int. Cl.
*H04L 29/08* (2006.01)
*H04L 12/18* (2006.01)
*H04L 29/06* (2006.01)

(52) U.S. Cl.
CPC .......... *H04L 12/18* (2013.01); *H04L 65/4076* (2013.01); *H04L 67/06* (2013.01); *H04L 67/14* (2013.01); *H04L 67/148* (2013.01)

(58) Field of Classification Search
USPC ................................................ 709/228, 231
See application file for complete search history.

(56) References Cited

U.S. PATENT DOCUMENTS

| | | | |
|---|---|---|---|
| 2005/0132000 A1* | 6/2005 | Richardson et al. | 709/204 |
| 2006/0005101 A1* | 1/2006 | Li et al. | 714/758 |
| 2007/0147411 A1 | 6/2007 | Bijwaard et al. | |
| 2007/0168523 A1* | 7/2007 | Jiang et al. | 709/228 |
| 2008/0101317 A1* | 5/2008 | Bouazizi | 370/342 |
| 2008/0288654 A1* | 11/2008 | Matuszewski et al. | 709/238 |
| 2009/0147718 A1* | 6/2009 | Liu et al. | 370/312 |
| 2009/0201929 A1* | 8/2009 | Patel | 370/390 |
| 2010/0011088 A1* | 1/2010 | Gautier et al. | 709/217 |
| 2010/0106851 A1 | 4/2010 | Aoki et al. | |
| 2010/0169504 A1* | 7/2010 | Gabin et al. | 709/231 |
| 2010/0278099 A1* | 11/2010 | Lee et al. | 370/328 |
| 2012/0259994 A1* | 10/2012 | Gillies et al. | 709/231 |
| 2013/0028118 A1* | 1/2013 | Cherian et al. | 370/252 |

FOREIGN PATENT DOCUMENTS

| | | | |
|---|---|---|---|
| EP | 1944944 A1 * | 7/2008 | |
| JP | 2008508762 A | 3/2008 | |
| WO | 2006013460 A1 | 2/2006 | |
| WO | 2008120374 A1 | 10/2008 | |
| WO | 2008155713 A2 | 12/2008 | |

* cited by examiner

*Primary Examiner* — Uzma Alam
(74) *Attorney, Agent, or Firm* — Coats & Bennett, PLLC

(57) ABSTRACT

There is described a method of delivering data from a server to a client device in a network. Data packets with a first source address are sent in a first session from the server to the client device. A Session Switch Information (SSI) message, including a second source address, is sent from the server to the client device. A second session is configured between the server and the client device, and data packets with a second source address are sent in the second session from the server to the client device. The same transport protocol may be used for both sessions, and the method can be 10 used to switch between unicast and multicast delivery.

22 Claims, 5 Drawing Sheets

SESSION SWITCHING DURING ONGOING DATA DELIVERY IN A NETWORK

TECHNICAL FIELD

The invention relates to unicast and multicast delivery of data in networks. In particular, although not exclusively, the invention relates to switching between unicast and multicast modes of delivery in telecommunications networks.

BACKGROUND

Steadily increasing bandwidths in fixed and mobile access to networks have encouraged increasing levels of data transactions from end users. Most of these transactions are downloads of content available in the public domain.

Most downloads take place using existing file download protocols over point to point (PTP) connections (i.e. unicast connections), or over point to multipoint (PTM) (i.e. broadcast/multicast connections).

Unicast transmission is the sending of information packets to a single network destination. The term "unicast" is formed in analogy to the word "broadcast" which means transmitting the same data to all destinations. Another multimode distribution method, "multicast", is similar to IP broadcasting, but implemented in more efficient manner.

Unicast messaging is used for all network processes where a private or unique resource is requested. Unicast is generally used where two way connections are needed to complete the network transaction.

Sending the same data to multiple unicast addresses requires the sender to send all the data many times over, once for each recipient. If it is required to send data to many recipients, broadcast or multicast approaches may be used. In a broadcast, data is sent to all possible destinations (an "all-hosts broadcast"): this permits a sender to send the data only once, and all receivers can copy it. For example, in the IP protocol, 255.255.255.255 represents a limited local broadcast. For multicast, a multicast address is associated with a group of interested receivers. According to RFC 3171, addresses 224.0.0.0 to 239.255.255.255 are designated as multicast addresses. The sender sends a single datagram (from the sender's unicast address) to the multicast address, and the intermediary routers take care of making copies and sending them to all receivers that have registered their interest in data from that sender.

Multicast, by its very nature, is not a connection-oriented mechanism, so protocols such as the Transmission Control Protocol (TCP), which allows for retransmission of missing packets, are generally not appropriate. One suitable protocol for multicast transmission is File Delivery over Unidirectional Transport (FLUTE), documented in RFC 3926.

FIGS. 1 and 2 illustrate unicast (PTP) and multicast (PTM) delivery of data packets of content in a cellular network. For simplicity, the following discussion describes the delivery of non-streaming data but it will be appreciated that the same principles apply to the delivery of streaming data. FIG. 1 is a schematic representation of elements of a network delivering the content data using unicast packets. A content provider 101 sends packets across a backbone network towards a Gateway GPRS Support Node (GGSN) 102. The GGSN identifies the addresses and locations of users subscribed to the content data, and forwards the packets to various Serving GPRS Support Nodes (SGSN) 103, 104. The SGSNs 103, 104 route the packets through radio networks 105, 106, 107 towards end users using mobile terminals 111-118. Each end user requires its own data, and therefore the data must be sent eight times from the content provider 101, and four from the GGSN 102 to each SGSN 103, 104. The same data is sent many times over into each radio network 105-106. It will be appreciated that this results in very inefficient usage of network resources.

FIG. 2 is a schematic representation of elements of the same network delivering the content data using multicast packets. The backbone network and, radio networks 105, 106, 107 must all support the use of multicast packets, and the gateway nodes must be able to route multicast packets. The content provider 101 need only transmit a single set of multicast data packets. Each gateway node recognises that the packets are multicast, and forwards the same data to more than one recipient. This ensures a more efficient use of network resources, but requires that all points in the network can deal with multicast data packets.

There are situations when a server delivering data over a PTP connection may wish to switch delivery to a PTM connection, or vice versa. For example, suppose a server is delivering data to only a few recipients, and has set up a PTP session with each of them. If more client devices request the data from the server, it may be desirable for the server to set up a PTM session so as to deliver the data to all of the recipients simultaneously.

Currently, all transfer protocols are used exclusively either for PTM delivery or for PTP delivery. In order for the server to stop sending data using the PTP sessions and start sending it using a PTM session it would be necessary to tear down all of the existing sessions and establish a new session, requiring the use of a different protocol. For example, the PTP sessions might operate under FTP protocol, which does not support multicast transmission. In order to send data to multiple recipients in a multicast session, the FTP sessions would have to be terminated, and a new session using a PTM protocol such as FLUTE would be required.

To allow such capability, the servers and client devices need to support a protocol for each delivery mode. Furthermore, additional control plane protocols with well defined signalling procedures are required to perform switching between the different types of session. This, in turn, results in a significant signalling load.

SUMMARY

The invention attempts to overcome, or at least mitigate, the above problems.

In accordance with one aspect of the invention there is provided a method of delivering data from a server to a client device in a network. Data packets with a first source address are sent in a first session from the server to the client device. A Session Switch Information (SSI) message, including a second source address, is sent from the server to the client device. A second session is configured between the server and the client device, and data packets with a second source address are sent in the second session from the server to the client device. The same transport protocol (e.g. FLUTE) may be used for both sessions, and the method may be used to switch between unicast and multicast delivery.

Thus it becomes possible to switch between delivery modes, i.e. between PTP and PTM, without interrupting an ongoing download.

It also allows the client devices to inform servers about their current status and progress when moving from a multicast to a unicast session, to allow severs to continue the transfer of content.

In accordance with another aspect of the invention there is provided a client device for use in a network. The client device comprises a receiver for receiving data packets with a first source address in a first session from a server in the network. A processor is operatively connected to the receiver for recovering content data from the data packets received. A transmitter is operatively connected to the processor for sending data into the network. The receiver is configured to receive an SSI message from the server, the SSI message including a second source address. The processor is configured, in response to the receipt of the SSI message, to instruct the transmitter to contact the server to set up delivery of data packets with a second source address in a second session. The processor is then configured to terminate the first session.

The data packets may be received using the same transport protocol (e.g. FLUTE) in the first and second sessions. The first source address may be a unicast source address and the second a multicast source address, or vice versa.

The client device may be configured to send an indication of content data already received when the second session is initiated, so that the data packets received in the second session complement those received in the first session.

In accordance with another aspect of the invention there is provided a server for use in a network. The server comprises a receiver for receiving data from the network, a processor operatively connected to the receiver, and a transmitter operatively connected to the processor. The transmitter is configured to send data packets with a first source address to at least one client device in a first session. The processor is configured to generate an SSI message, including a second source address, for transmission to the at least one client device. The receiver is configured to receive a request from the at least one client device for delivery of packets with the second source address. The transmitter is further configured to send data packets with the second source address to the at least one client device in a second session.

The SSI message may include a recommended completion threshold so that, if the at least one client device is less than a predetermined distance from completion of the first session, it can continue to receive the data packets with the first source address in the first session.

The SSI message may include a timestamp indicating when the first session will be terminated, for enabling the at least one client device to make a decision as to whether to continue with the first session.

The SSI message may include a category indicator indicating that a specific subset of client devices should use the information contained therein.

In accordance with another aspect of the invention there is provided a client program which, when run on a client device in a network, causes the client device to receive data packets with a first source address from a server in the network in a first session. The client program also causes the client device to receive an SSI message from the server, the SSI message including a second source address, set up delivery of data packets with a second source address in a second session, and terminate the first session.

In accordance with another aspect of the invention there is provided a server program which, when run on a server in a network, causes the server to send data packets with a first source address to at least one client device in a first session. The server program also causes the server to send an SSI message for transmission to the at least one client, the SSI message including a second source address, and send data packets with the second source address to the at least one client device in a second session.

The invention also provides a carrier medium containing such a client program or server program.

BRIEF DESCRIPTION OF THE DRAWINGS

Some embodiments of the invention will now be described by way of example only and with reference to the accompanying drawings, in which.

DETAILED DESCRIPTION

Figure 1:
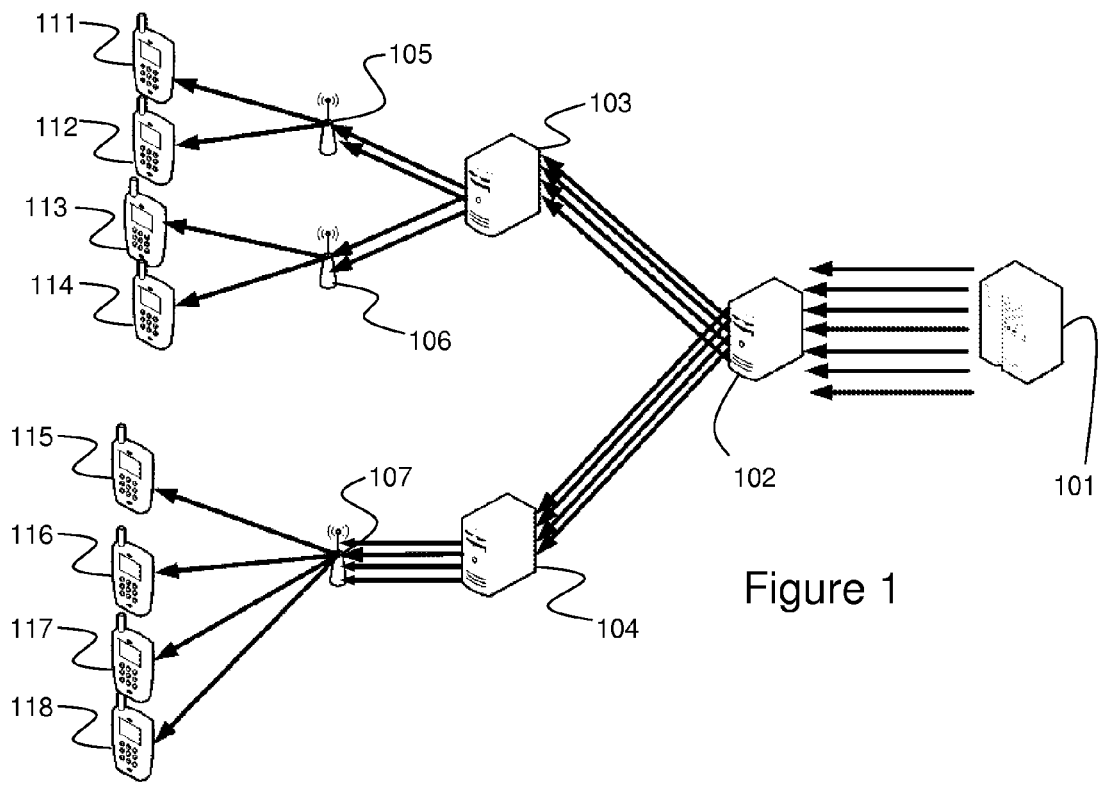
FIG. 1 is a schematic illustration of a network in which data is delivered using unicast sessions.
Figure 2:
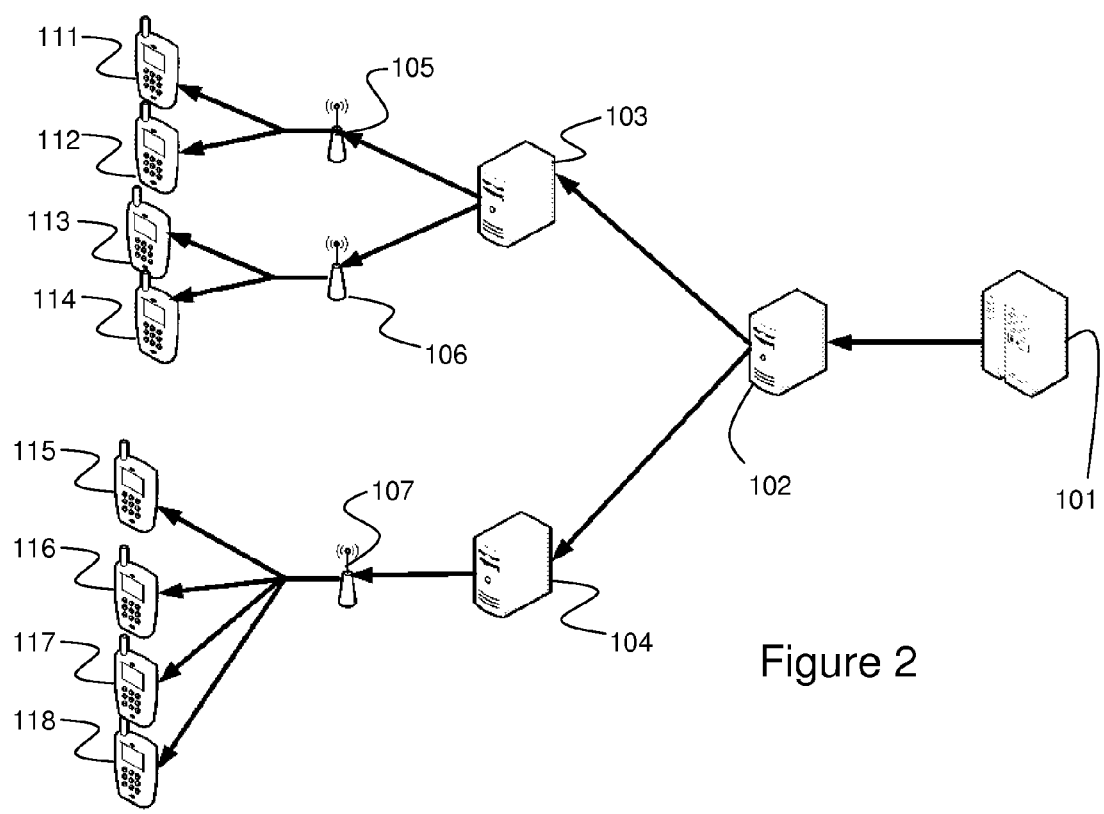
FIG. 2 is a schematic illustration of a network in which data is delivered using a multicast session.

As previously discussed with reference to FIGS. 1 and 2, networks have traditionally used protocols such as FTP for unicast delivery of files, and FLUTE for multicast delivery of files. The FLUTE protocol is designed for unidirectional delivery of files over PTM connections. However, the protocol does not include a limitation to PTM connections, and can also be used for PTP connections.

This makes it possible for servers to use the FLUTE protocol to operate both PTP and PTM sessions. By using a control frame, a server currently operating a PTM session can instruct client devices to leave the PTM session and continue their download sessions in a PTP mode (or to instruct client devices to leave an existing PTP session and continue in a PTM mode). In the following description this control frame has been referred to as Session Switch Information (SSI). The SSI contains a new source address, and instructions to client devices to change to this new source address.

Figure 3:
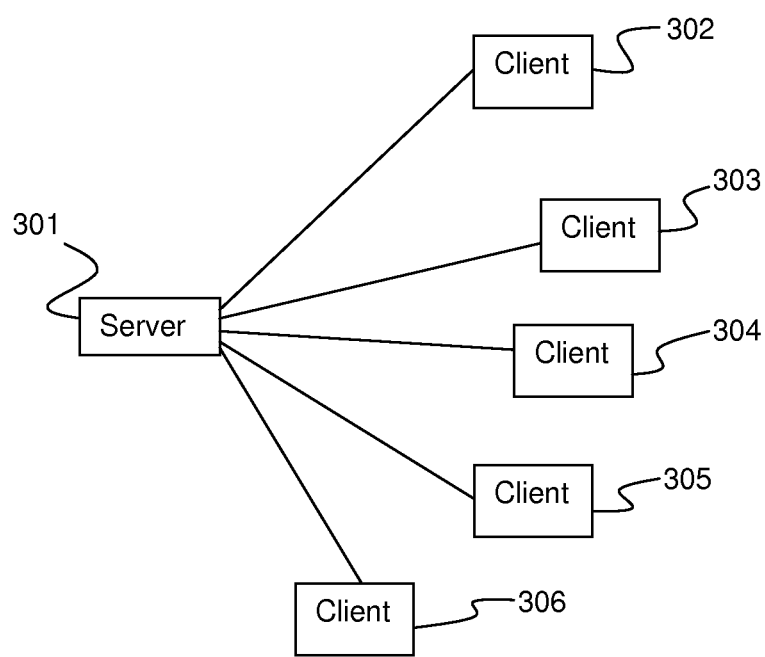
FIG. 3 is a schematic illustration of a network containing client devices and a server.

FIG. 3 is a schematic illustration of a network containing a server 301 and client devices 302-306. It will be appreciated that other elements (e.g. routers, gateways etc.), not shown in FIG. 3, may also be present in the network One of the client devices 302 may acquire information about content availability through a service announcement mechanism which provides a source address along with other protocol and access details. This may be done using existing protocols like SDP (Session Description Protocol).

This client device 302 contacts the server 301 to request content. In this example, suppose this is the only client device to request content. The server establishes a PTP (unicast) connection with the client device using the FLUTE protocol, and sends packets with a unicast source address.

If some of the other client devices 303, 304, 305, 306 in the network now request the same service, the server decides that a PTM (multicast) mechanism would be more appropriate for the delivery of the content, and instructs the client device 302 (and any other client devices with PTP connections for the same service) to switch to PTM delivery mode.

Figure 4:
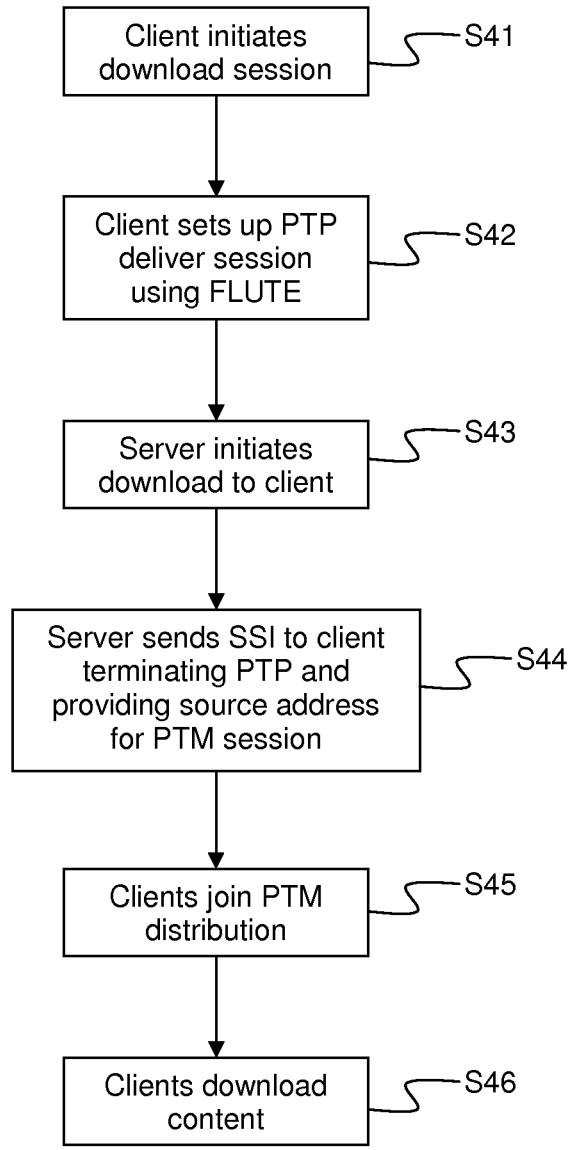
FIG. 4 is a flow diagram illustrating the sequence of events involved in switching from PTP to PTM sessions.

The sequence of events is illustrated in FIG. 4, as follows:

S41. Client device 302 receives unicast source address and other protocol information needed to initiate download session.

S42. Client device 302 sets up PTP delivery session using FLUTE (RFC 3962).

S43. Server 301 initiates download by sending the FDT (File Delivery Table) instance followed by the download objects.

S44. Server 301 decides to move all client devices downloading a specific content collection to a PTM delivery source. It sends out an SSI to each of the client devices. The SSI contains a new (multicast) source address.

S45. The client devices 301-306 join the new PTM distribution with the multicast source address, and terminate their PTP session when successful. The server ensures that the content indexing and the Transport Object Identifier (TOI) designations used by the independent FLUTE sessions are consistent with the PTM session.

S46. The client devices continue to download content over the new session.

Figure 5:
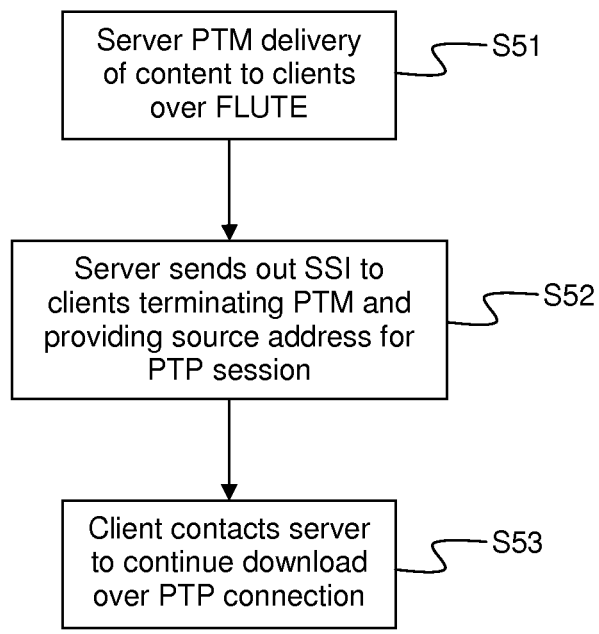
FIG. 5 is a flow diagram illustrating the sequence of events involved in switching from PTM to PTP sessions.

A similar sequence of events is followed, as shown in FIG. 5, to switch from a PTM session to a PTP session. Initially, a client device may have started download over a PTM session or may have switched to one from a PTP session.

S51. Server delivery of content (with multicast source address) over FLUTE.

S52. Server decides to terminate delivery over PTM and start a PTP session for all active client devices. It sends out an SSI informing client devices of the pending termination of the PTM session and instructing them to initiate PTP sessions to continue download. A unicast source address is included in the SSI.

S53. The client device uses the information provided in the SSI to contact the server (or another server) and continue its download over a PTP connection using a FLUTE session. The client device provides a modified version of the FDT to the server, identifying files that have been received so far either completely or in part. This allows the server to begin delivery from the most optimum point.

The FLUTE protocol does not provide an interactive channel for the client device to contact the server, but the existence of such a channel is an implicit part in present network scenarios.

It will be appreciated that sessions are uniquely identified in the FLUTE protocol by their source addresses. The arrangement described above enables a client device to switch from one (e.g. PTP) session to another (e.g. PTM) session by switching source address. However, the server and client device now both recognise that the new session is effectively a continuation of the old one, despite the different source address.

Figure 6:
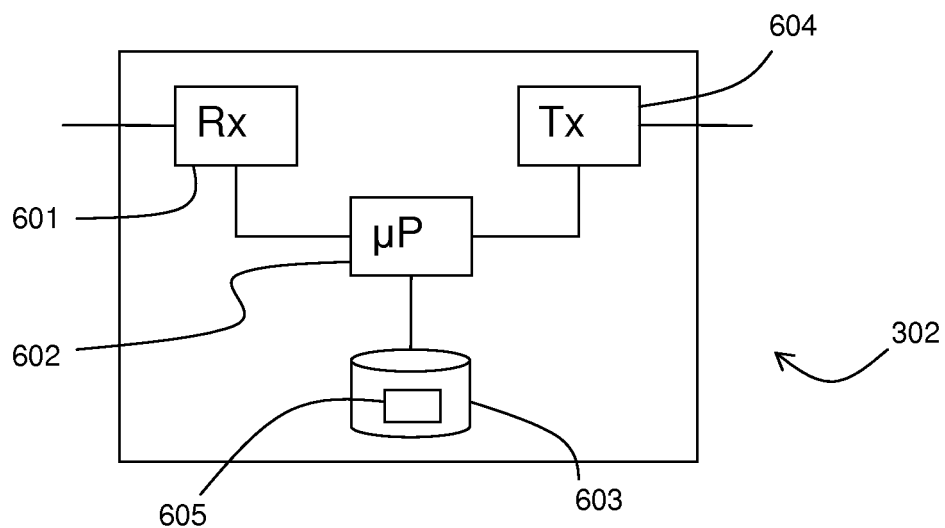
FIG. 6 is a schematic diagram illustrating the architecture of a client device.

FIG. 6 is a schematic diagram illustrating the architecture of a client device 302. The client device 302 includes a receiver 601 for receiving packets from a server 301. A processor 602 is operatively connected to the receiver 601 and a carrier medium 603 in the form of a memory. When an SSI is received from the server 302, the processor identifies the new source address contained therein, and instructs a transmitter 604 to contact the new source address so as to continue the download. In this embodiment a client program 605 is stored in the memory for causing the processor 602 to carry out the functions described above.

Figure 7:
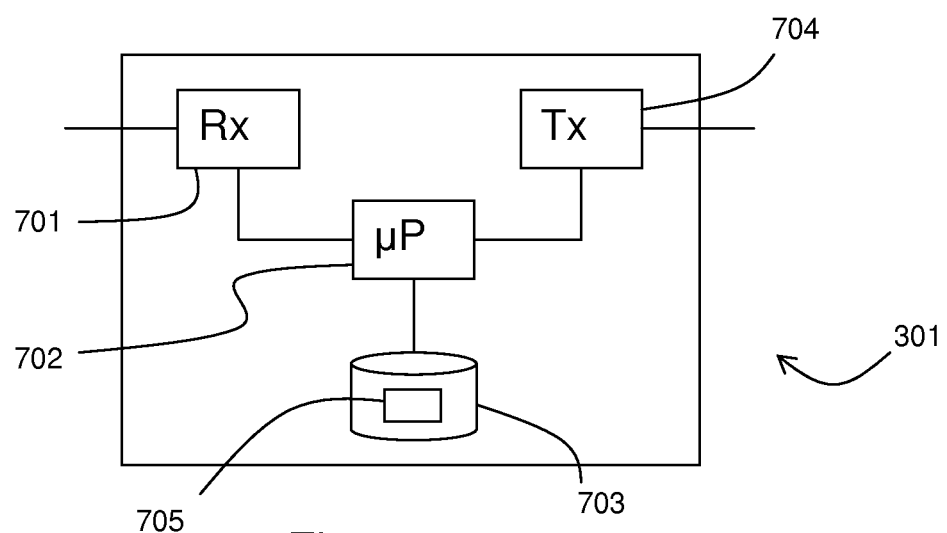
FIG. 7 is a schematic diagram illustrating the architecture of a server.

FIG. 7 is a schematic diagram illustrating the architecture of a server 301. A transmitter 704 sends content towards client devices 301-306. A processor 702 is operatively connected to the transmitter 704 and a carrier medium 703 in the form of a memory. If it is required to change from a PTP session to a PTM session, or vice versa, the processor generates an SSI and instructs the transmitter 704 to send this to all client devices in the current session. A receiver is also operatively connected to the processor 702, so that client devices can initiate download sessions. In this embodiment a server program 705 is stored in the carrier medium 703 for causing the processor 702 to carry out the functions described above.

In order to improve system performance, when issuing instructions to switch from PTP to PTM, the server can recommend a completion threshold to allow client devices that are close to the completion of their session to finish their transfer rather than reconfigure their session.

In addition, when moving from PTM to PTP, the server can provide a timing reference such as a Network Time Protocol (NTP) timestamp indicating a cut off over broadcast, allowing client devices to calculate based on their current remaining download and bandwidth to decide if they need to reconfigure.

As a further optimisation, the network may use a category identifier to indicate that the SSI information is relevant only to a specific subset of client devices receiving the data delivery.

The approach outlined above allows servers to switch delivery modes based on content popularity and network resources, and to do so with minimum disruption to the client device.

It will be appreciated that variations from the above described embodiments may still fall within the scope of the invention. For example, the approach described enables switching between a PTM session and a PTP session, but could equally well be used to switch between different PTM sessions or PTP sessions.

In addition, as shown in FIG. 3, the same server provides content to the client devices 302-306 whether by a PTP or PTM mechanism. It will be appreciated that the switch to a new source address may result in a different server (not shown in FIG. 3) supplying the content, although this would require signalling between the servers supplying content before and after the switch, in order to ensure that the content at the client devices would continue to be received from the right point.

The invention claimed is:

1. A server for use in a network, the server comprising:
a receiver configured to receive data from at least one client device in the network;
a processor operatively connected to the receiver; and
a transmitter operatively connected to the processor and configured to send data packets with a first source address to the at least one client device in a first session;
wherein the processor is configured to generate a session switch information message for transmission to the at least one client device, the session switch information message including a second source address;
wherein the session switch information message includes a recommended completion threshold so that, if the at least one client device is less than a predetermined distance from completion of the first session, it can continue to receive the data packets with the first source address in the first session;
wherein the receiver is further configured to receive a request from the at least one client device for delivery of packets with the second source address;
wherein the transmitter is further configured to send data packets with the second source address to the at least one client device in a second session; and
wherein the server is configured so that the data packets are sent using the same transport protocol in the first and second sessions.

2. The server of claim 1 wherein the transmitter is configured so that the data packets are sent using the same transport protocol in the first and second sessions.

3. The server of claim 2 wherein the transport protocol comprises a file delivery over unidirectional transport (FLUTE) protocol.

4. The server of claim 1 wherein the first source address comprises a unicast source address and the second source address comprises a multicast source address.

5. The server of claim 1 wherein the first source address comprises a multicast source address and the second source address comprises a unicast source address.

6. The server of claim 1 wherein the second session comprises a continuation of the first session.

7. A server for use in a network, the server comprising:
a receiver configured to receive data from at least one client device in the network;
a processor operatively connected to the receiver; and
a transmitter operatively connected to the processor and configured to send data packets with a first source address to the at least one client device in a first session;
wherein the processor is configured to generate a session switch information message for transmission to the at least one client device, the session switch information message including a second source address;
wherein the session switch information message includes a timestamp indicating when the first session will be terminated to enable the at least one client device to make a decision as to whether to continue with the first session;
wherein the receiver is further configured to receive a request from the at least one client device for delivery of packets with the second source address;
wherein the transmitter is further configured to send data packets with the second source address to the at least one client device in a second session; and
wherein the server is configured so that the data packets are sent using the same transport protocol in the first and second sessions.

8. The server of claim 7 wherein the transmitter is configured so that the data packets are sent using the same transport protocol in the first and second sessions.

9. The server of claim 8 wherein the transport protocol comprises a file delivery over unidirectional transport (FLUTE) protocol.

10. The server of claim 7 wherein the first source address comprises a unicast source address and the second source address comprises a multicast source address.

11. The server of claim 7 wherein the first source address comprises a multicast source address and the second source address comprises a unicast source address.

12. The server of claim 7 wherein the second session comprises a continuation of the first session.

13. A method of delivering data from a server to a client device in a network, the method comprising:
sending data packets with a first source address in a first session from the server to the client device;
sending a session switch information message from the server to the client device, the session switch information message including a second source address;
wherein the session switch information message includes a recommended completion threshold so that, if the at least one client device is less than a predetermined distance from completion of the first session, it can continue to receive the data packets with the first source address in the first session;
configuring a second session between the server and the client device; and
sending data packets with the second source address in the second session from the server to the client device responsive to the session switch information message, wherein the same transport protocol is used for both sessions.

14. The method of claim 13 further comprising using the same transport protocol for both sessions.

15. The method of claim 14 wherein the transport protocol comprises a file delivery over unidirectional transport (FLUTE) protocol.

16. The method of claim 13 wherein the first source address comprises a unicast source address and the second source address comprises a multicast source address, or the first source address comprises a multicast source address and the second source address comprises a unicast source address.

17. A server program stored in a memory of a server in a network, said server program, when run on the server, causing the server to:
send data packets with a first source address to at least one client device in a first session;
send a session switch information message for transmission to the at least one client device, the session switch information message including a second source address;
wherein the session switch information message includes a recommended completion threshold so that, if the at least one client device is less than a predetermined distance from completion of the first session, it can continue to receive the data packets with the first source address in the first session; and
send data packets with the second source address to the at least one client device in a second session, wherein the first and second sessions use the same transport protocol.

18. A method of delivering data from a server to a client device in a network, the method comprising:
sending data packets with a first source address in a first session from the server to the client device;
sending a session switch information message from the server to the client device, the session switch information message including a second source address;
wherein the session switch information message includes a timestamp indicating when the first session will be terminated to enable the at least one client device to make a decision as to whether to continue with the first session;
configuring a second session between the server and the client device; and
sending data packets with the second source address in the second session from the server to the client device responsive to the session switch information message, wherein the same transport protocol is used for both sessions.

19. The method of claim 18 further comprising using the same transport protocol for both sessions.

20. The method of claim 19 wherein the transport protocol comprises a file delivery over unidirectional transport (FLUTE) protocol.

21. The method of claim 18 wherein the first source address comprises a unicast source address and the second source address comprises a multicast source address, or the first source address comprises a multicast source address and the second source address comprises a unicast source address.

22. A server program stored in a memory of a server in a network, said server program, when run on the server, causing the server to:
- send data packets with a first source address to at least one client device in a first session;
- send a session switch information message for transmission to the at least one client device, the session switch information message including a second source address;
- wherein the session switch information message includes a timestamp indicating when the first session will be terminated to enable the at least one client device to make a decision as to whether to continue with the first session; and
- send data packets with the second source address to the at least one client device in a second session, wherein the first and second sessions use the same transport protocol.

* * * * *